US008228976B2

(12) United States Patent
Hsiao et al.

(10) Patent No.: US 8,228,976 B2
(45) Date of Patent: Jul. 24, 2012

(54) DUAL-PORT INPUT EQUALIZER

(75) Inventors: Chiao-Wei Hsiao, Taichung (TW); Shyr-Chyau Luo, Kaohsiung (TW); Chien-Cheng Tu, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 394 days.

(21) Appl. No.: 12/650,566

(22) Filed: Dec. 31, 2009

(65) Prior Publication Data
US 2011/0032977 A1 Feb. 10, 2011

(30) Foreign Application Priority Data

Aug. 5, 2009 (TW) .............................. 98126373 A

(51) Int. Cl.
*H03K 5/159* (2006.01)
(52) U.S. Cl. ........................ 375/232; 375/229
(58) Field of Classification Search .................. 375/229, 375/230, 232; 327/359, 563, 552; 330/252, 330/304, 303; 333/18, 28 R
See application file for complete search history.

(56) References Cited

U.S. PATENT DOCUMENTS

| | | | | |
|---|---|---|---|---|
| 2001/0033191 | A1* | 10/2001 | El-Gamal | 327/350 |
| 2002/0041212 | A1* | 4/2002 | Bruck et al. | 330/252 |
| 2003/0076180 | A1* | 4/2003 | Murakami | 331/57 |
| 2009/0074048 | A1* | 3/2009 | Amin et al. | 375/229 |

FOREIGN PATENT DOCUMENTS
CN 1691526 A 11/2005
\* cited by examiner

*Primary Examiner* — Aristocratis Fotakis
(74) *Attorney, Agent, or Firm* — Winston Hsu; Scott Margo

(57) ABSTRACT

A dual-port input equalizer includes a control unit for generating a first control signal and a second control signal according to a selection signal, a first equalizer for receiving a first and second differential voltage for equalization according to the first control signal and the second control signal, which the first equalizer includes a first transistor, a second transistor, an passive loading portion, and a first zero-point generation circuit, a second equalizer for receiving a third and fourth differential voltage for equalization according to the first control signal and the second control signal, which the second equalizer includes a third transistor and a fourth transistor, which the drain of the first transistor, the second transistor, third transistor, and the fourth transistor coupled to the passive loading portion, and the source of the first transistor, the second transistor, third transistor, and the fourth transistor coupled to the first zero-point generation circuit.

33 Claims, 7 Drawing Sheets

DUAL-PORT INPUT EQUALIZER

BACKGROUND OF THE INVENTION

1. Field of the Invention

The present invention relates to a dual-port input equalizer, and more particularly, to a dual-port input equalizer capable of sharing common circuit elements.

2. Description of the Prior Art

With advanced development in technology, various high speed signal transmission interface technologies, such as digital visual interface (DVI), high definition multimedia interface (HDMI), etc., have been presented and are utilized widely in communication, storage, or image processing systems. Therefore, many electronic products for daily life, such as multimedia players, set-top boxes, game consoles, home audio/video equipment, personal computers, portable apparatuses, etc., are equipped with such signal transmission interfaces for inputting or outputting various audio and image data.

In general, channel attenuation and inter-symbol interference (ISI) effect for the transmitted signals are becoming serious concerns with increasing transmission channels, both of which reduce the quality of the transmitted signal. Therefore, an equalization process is utilized at the receiving end for compensating attenuation and canceling the ISI effect for the transmitted signal. Please refer to FIG. 1. FIG. 1 is a schematic diagram of an equalizer 10 according to the prior art. The equalizer 10 is able to compensate channel attenuation of the differential signals (input signals $V_{IN1}$ and $V_{IN2}$) transmitted from the cable and cancel the ISI effect of the differential signal. The equalizer 10 includes a first transistor $M_1$, a second transistor $M_2$, resistors $R_1$, $R_2$, $R_3$, capacitor $C_1$, a first current source $I_{S1}$, and a second current source $I_{S2}$. The interconnections of the units are as shown in FIG. 1. In the equalizer 10, the first transistor $M_1$ and the second transistor $M_2$ are n-type metal oxide semiconductor transistors, respectively, which are utilized for outputting signals $V_{O1}$ and $V_{O2}$ according to input signals $V_{IN1}$ and $V_{IN2}$. In addition, the resistors $R_3$ and the capacitor $C_1$ are coupled between the source of the first transistor $M_1$ and the second transistor $M_2$ in a parallel manner to form a common mode structure. The first current source $I_{S1}$ and the second current source $I_{S2}$ can derive current from the source of the first transistor $M_1$ and the second transistor $M_2$ for operation.

However, with the diversity of electronic products, the product design needs to satisfy many possible requirements. For example, two or more receiving ports of the HDMI transmission interface may be designed in an electronic product for receiving various signals from different sources. For the conventional circuit scheme, the amount of the equalizers should depend on the amount of the signal sources. In such a condition, the components of the equalizers, such as the load portion (resistors $R_1$, $R_2$), the zero-point generation circuit (resistors $R_3$ and capacitor $C_1$), and the current source $I_{S1}$ and $I_{S2}$ will occupy much circuit area, and the circuit area may increase in multiples with the increased amount of the signal sources, thus increasing the difficulty of system design and manufacturing cost.

SUMMARY OF THE INVENTION

It is therefore a primary objective of the present invention to provide a dual-port input equalizer.

The present invention discloses a dual-port input equalizer, comprising: a control unit, for generating a first control signal and a second control signal according to a selection signal; a first input signal processing unit, coupled to the control unit, for receiving a first differential current and outputting a first differential voltage according to the first control signal and the second control signal; a second input signal processing unit, coupled to the control unit, for receiving a second differential current and outputting a second differential voltage according to the first control signal and the second control signal; a third input signal processing unit, coupled to the control unit, for receiving a third differential current and outputting a third differential voltage according to the first control signal and the second control signal; a fourth input signal processing unit, coupled to the control unit, for receiving a fourth differential current and outputting a fourth differential voltage according to the first control signal and the second control signal; a first equalizer, coupled to the first input signal processing unit and the second input signal processing unit, for receiving the first differential voltage and the second differential voltage according to the first control signal and the second control signal, the first equalizer comprising: a first node; a second node; a third node; a fourth node; a first transistor, comprising a first terminal coupled to the first input signal processing unit, a second terminal coupled to the first node, and a third terminal coupled to the third node; a second transistor, comprising a first terminal coupled to the second input signal processing unit, a second terminal coupled to the second node, and a third terminal coupled to the fourth node; a load unit, coupled to a voltage source, the first node, and the second node; a first zero-point generation circuit, coupled between the third node and the fourth node; a first current source, coupled between the third node and a ground end; and a second current source, coupled between the fourth node and the ground end; and a second equalizer, coupled to the third input signal processing unit and the fourth input signal processing unit, for receiving the third differential voltage and the fourth differential voltage according to the first control signal and the second control signal, the second equalizer comprising: a fifth node; a sixth node; a third transistor, comprising a first terminal coupled to the third input signal processing unit, a second terminal coupled to the first node of the first equalizer, and a third terminal coupled to the fifth node; and a fourth transistor, comprising a first terminal coupled to the fourth input signal processing unit, a second terminal coupled to the second node of the first equalizer, and a third terminal coupled to the sixth node; wherein the first equalizer receives the first differential voltage and the second differential voltage when the selection signal is at a first level, and the second equalizer receives the third differential voltage and the fourth differential voltage when the selection signal is at a second level.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
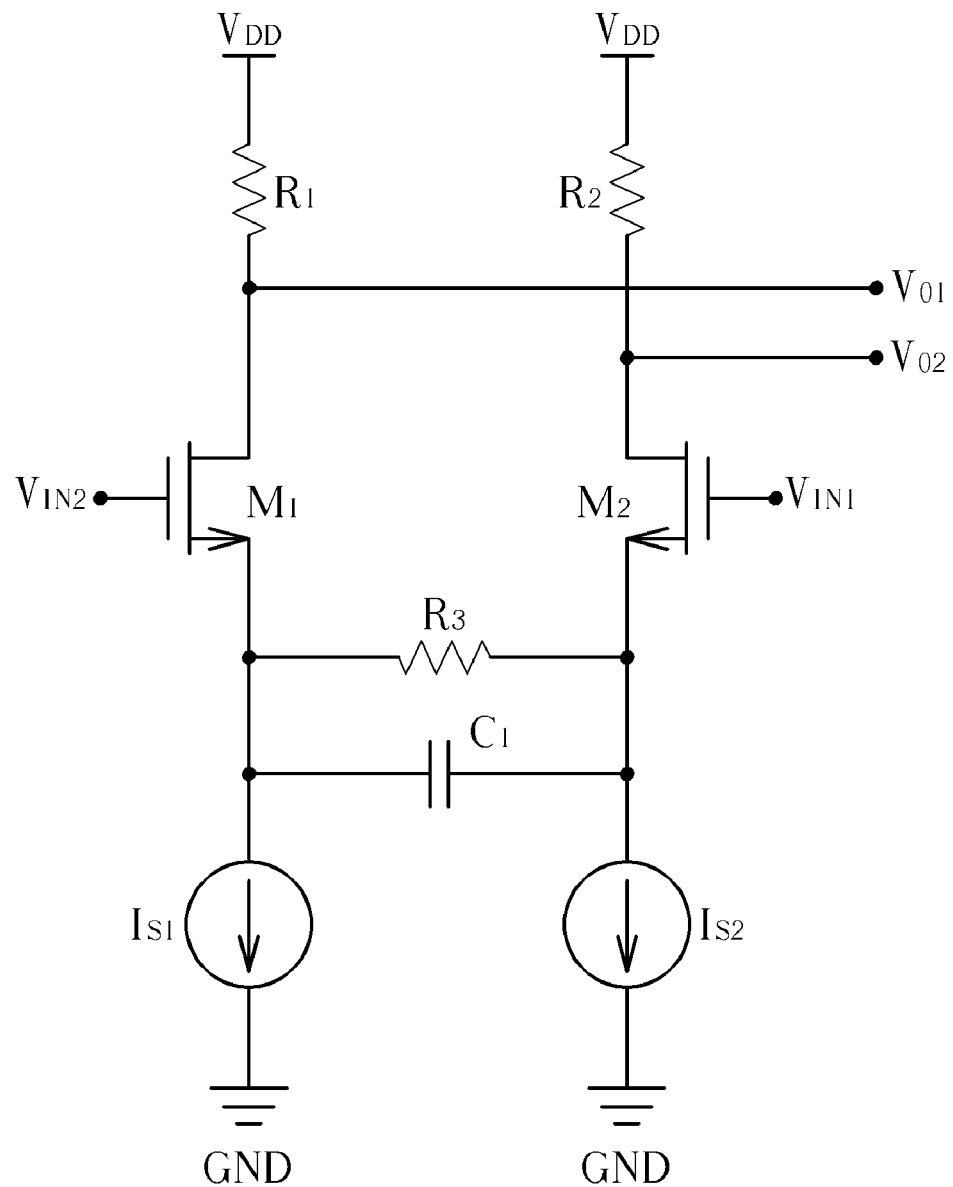
FIG. 1 is a schematic diagram of an equalizer according to the prior art.
Figure 2:
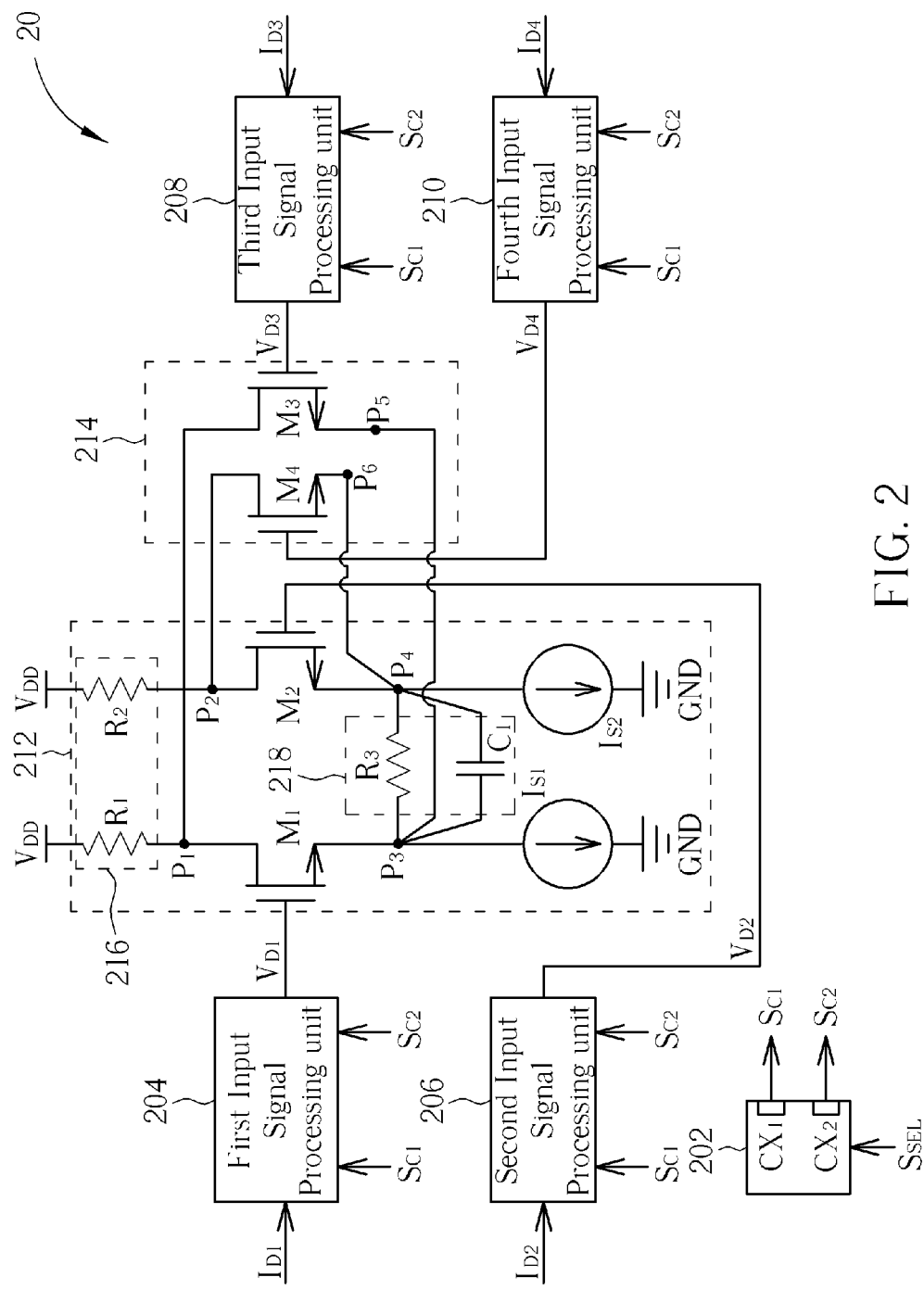
FIG. 2 is a schematic diagram of a dual-port input equalizer according to a first embodiment of the present invention.

Please refer to FIG. 2. FIG. 2 is a schematic diagram of a dual-port input equalizer 20 according to a first embodiment of the present invention. The dual-port input equalizer 20 is utilized for providing an equalization process for two signals from different sources. For example, the dual-port input equalizer 20 can be implemented in a transition minimized differential signal (TMDS) receiver having two receiving ports for equalizing two video signals from different sources. The dual-port input equalizer 20 includes a control unit 202, a first input signal processing unit 204, a second input signal processing unit 206, a third input signal processing unit 208, a fourth input signal processing unit 210, a first equalizer 212, and a second equalizer 214.

The control unit 202 includes a first end CX1 and a second end CX2, and is utilized for generating a first control signal $S_{C1}$ via the first end CX1 and a second control signal $S_{C2}$ via the second end CX2 according to a selection signal $S_{SEL}$. Preferably, the second control signal $S_{C2}$ is the inverted first control signal $S_{C1}$. The selection signal $S_{SEL}$ can be inputted by a user or other related device for indicating to the dual-port input equalizer 20 which signal is received. The first input signal processing unit 204 is coupled to the control unit 202 and the first equalizer 212 for receiving a first differential current $I_{D1}$ and outputting a first differential voltage $V_{D1}$ according to the first control signal $S_{C1}$ and the second control signal $S_{C2}$. The second input signal processing unit 206 is coupled to the control unit 202 and the first equalizer 212 for receiving a second differential current $I_{D2}$ and outputting a second differential voltage $V_{D2}$ according to the first control signal $S_{C1}$ and the second control signal $S_{C2}$. The third input signal processing unit 208 is coupled to the control unit 202 and the second equalizer 214 for receiving a third differential current $I_{D3}$ and outputting a third differential voltage $V_{D3}$ according to the first control signal $S_{C1}$ and the second control signal $S_{C2}$. The fourth input signal processing unit 210 is coupled to the control unit 202 and the second equalizer 214 for receiving a fourth differential current $I_{D4}$ and outputting a fourth differential voltage $V_{D4}$ according to the first control signal $S_{C1}$ and the second control signal $S_{C2}$. The first equalizer 212 is coupled to the first input signal processing unit 204 and the second input signal processing unit 206 for receiving the first differential voltage $V_{D1}$ and the second differential voltage $V_{D2}$ according to the first control signal $S_{C1}$ and the second control signal $S_{C2}$ to perform an equalizing process. Similarly, the second equalizer 214 is coupled to the third input signal processing unit 208 and the fourth input signal processing unit 210 for receiving the third differential voltage $V_{D3}$ and the fourth differential voltage $V_{D4}$ according to the first control signal $S_{C1}$ and the second control signal $S_{C2}$ to perform an equalizing process.

Please further refer to FIG. 2. The first equalizer 212 includes a first node $P_1$, a second node $P_2$, a third node $P_3$, a fourth node $P_4$, a first transistor $M_1$, a second transistor $M_2$, a load unit 216, a first zero-point generation circuit 218, a first current source $I_{S1}$, and a second current source $I_{S2}$. Preferably, the first transistor $M_1$ and the second transistor $M_2$ can be n-type metal oxide semiconductor (MOS) transistors, respectively. As shown in FIG. 2, the gate of the first transistor $M_1$ is coupled to the first input signal processing unit 204, the drain of the first transistor $M_1$ is coupled to the first node $P_1$, and the source of the first transistor $M_1$ is coupled to the third node $P_3$. The gate of the second transistor $M_2$ is coupled to the second input signal processing unit 206, the drain of the second transistor $M_2$ is coupled to the second node $P_2$, and the source of the second transistor $M_2$ is coupled to the fourth node $P_4$. In addition, in the embodiment of the present invention, the load unit 216 includes a first resistor $R_1$ and a second resistor $R_2$. The first resistor $R_1$ is coupled between a voltage source $V_{DD}$ and the first node P1 for a passive loading portion of the first transistor $M_1$. The second resistor $R_2$ is coupled between the voltage source $V_{DD}$ and the second node P2 for a passive loading portion of the second transistor $M_2$. The first zero-point generation circuit 218 includes a third resistor $R_3$ and a first capacitor $C_1$. The third resistor $R_3$ and the first capacitor $C_1$ are coupled between the third node $P_3$ and the fourth node $P_4$ in parallel. The first current source $I_{S1}$ is coupled between the third node $P_3$ and a ground end GND. The second current source $I_{S2}$ is coupled between the fourth node $P_4$ and the ground end GND.

Therefore, if the user wants to utilize the first equalizer 212 to perform an equalization process for specific signals, such as the first differential current $I_{D1}$ and the second differential current $I_{D2}$, a corresponding selection signal $S_{SEL}$ is inputted to the control unit 202, and then the corresponding first control signal $S_{C1}$ and second control signal $S_{C2}$ are outputted by the control unit 202₁ via the first end CX1 and a second control signal $S_{C2}$ via the second end CX2 according to the corresponding selection signal $S_{SEL}$. In such a condition, the first equalizer 212 is able to receive the first differential voltage $V_{D1}$ and the second differential voltage $V_{D2}$ and perform the corresponding equalization process according to the corresponding first control signal $S_{C1}$ and second control signal $S_{C2}$. Furthermore, the second equalizer 214 includes a fifth node $P_5$, a sixth node $P_6$, a third transistor $M_3$, and a fourth transistor $M_4$. Preferably, the third transistor $M_3$ and the fourth transistor $M_2$ can be n-type MOS transistors respectively. As shown in FIG. 2, the gate of the third transistor $M_3$ is coupled to the third input signal processing unit 208, the drain of the third transistor $M_3$ is coupled to the first node $P_1$ of the first equalizer 212, and the source of the third transistor $M_3$ is coupled to the fifth node $P_5$. The gate of the fourth transistor $M_4$ is coupled to the fourth input signal processing unit 210, the drain of the fourth transistor $M_4$ is coupled to the second node $P_2$ of the first equalizer 212, and the source of the fourth transistor $M_4$ is coupled to the sixth node $P_6$. The fifth node $P_5$ is coupled to the third node $P_3$, and the sixth node $P_6$ is coupled to the fourth node $P_4$. In other words, the first equalizer 212 and the second equalizer 214 can share the load unit 216 and the first zero-point generation circuit 218 as a passive loading portion and a zero-point generation portion. In this situation, an equalization process is performed by one of the equalizers at one time. For example, when the first control signal $S_{C1}$ is at a low level, the first equalizer 212 can receive the first differential voltage $V_{D1}$ and the second differential voltage $V_{D2}$ and perform an equalization process with these signals. When the first control signal $S_{C1}$ is at a high level, the second equalizer 214 can receive the third differential voltage $V_{D3}$ and the fourth differential voltage $V_{D4}$ and perform an equalization process.

Therefore, in the embodiment of the present invention, the user can utilize the selection signal $S_{SEL}$ to select the required signal source, and the control unit 200 then transmits the corresponding first control signal $S_{C1}$ and second control signal $S_{C2}$ according to the selection signal $S_{SEL}$ to control the corresponding equalizer to perform an equalization process. In such a condition, the first equalizer 212 and the second equalizer 214 can share the same circuit elements so as to reduce circuit area and product size, and also decrease manufacturing cost.

Figure 3:
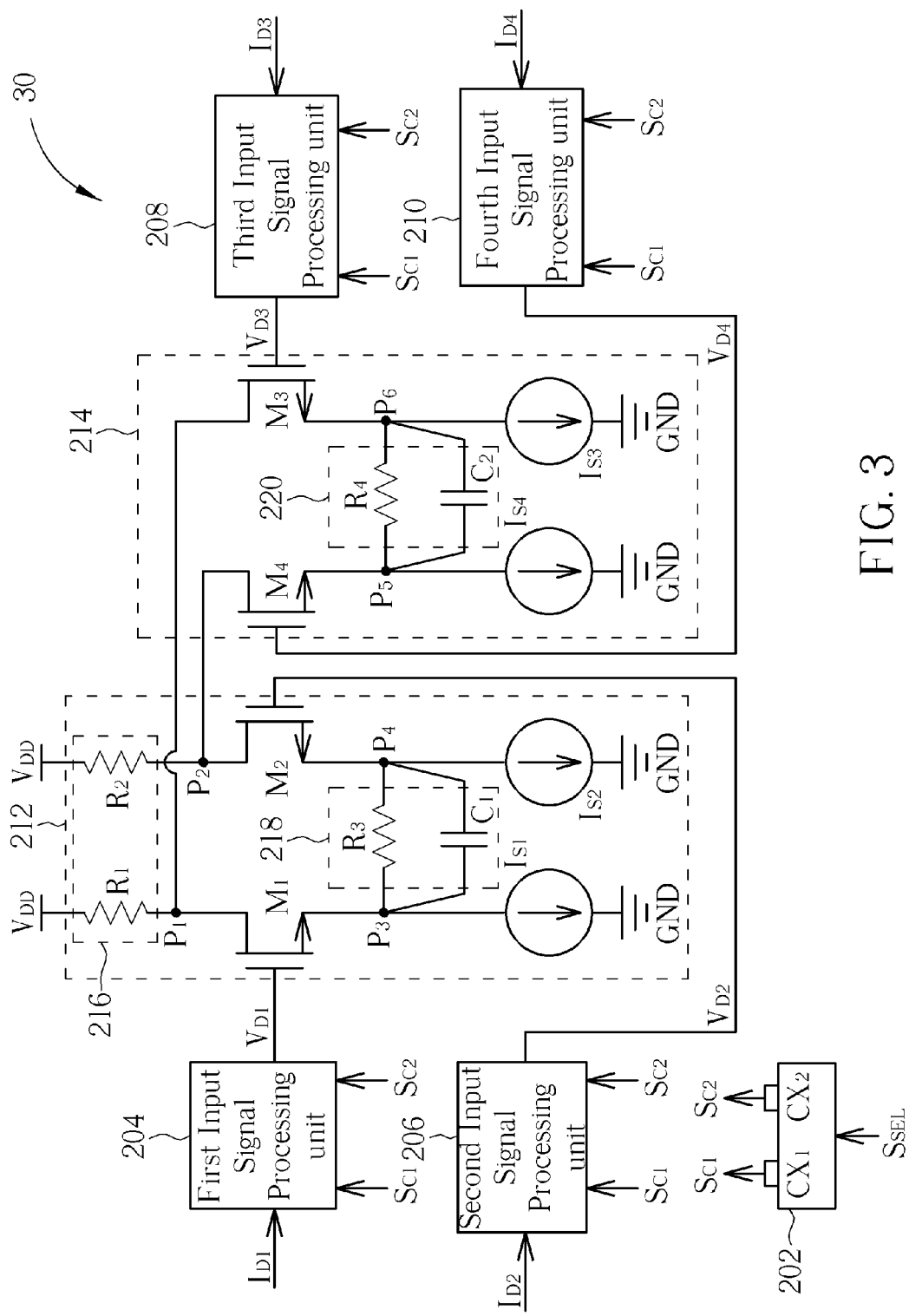
FIG. 3 is a schematic diagram of a dual-port input equalizer according to a second embodiment of the present invention.

Note that the embodiment of the dual-port input equalizer 20 is an exemplary embodiment of the present invention, and those skilled in the art can make alternations and modifications accordingly. For example, please refer to FIG. 3. FIG. 3 is a schematic diagram of a dual-port input equalizer 30 according to second embodiment of the present invention. Please note that elements of the dual-port input equalizer 30 shown in FIG. 3 with the same designations as those in the dual-port input equalizer 20 shown in FIG. 2 have similar operations and functions, and further description thereof is omitted for brevity. The interconnections of the units are as shown in FIG. 3. Compared with the dual-port input equalizer 20 shown in FIG. 2, the fifth node $P_5$ and the sixth node $P_6$ of the second equalizer 214 are not coupled to the third node $P_3$ and the fourth node $P_4$ of the first equalizer 212 in FIG. 3. Moreover, the second equalizer 214 further includes a second zero-point generation circuit 220, a third current source $I_{S3}$, and a fourth current source $I_{S4}$. The second zero-point generation circuit 220 includes a fourth resistor $R_4$ and a second capacitor $C_2$. The fourth resistor $R_4$ and the second capacitor $C_2$ are coupled between the fifth node $P_5$, and the sixth node $P_6$ in parallel. The third current source $I_{S3}$ is coupled between the fifth node $P_5$ and the ground end GND. The fourth current source $I_{S4}$ is coupled between the sixth node $P_6$ and the ground end GND. In other words, the second equalizer 214 shares the first resistor $R_1$ and the second resistor $R_2$ of the first equalizer 212 as its passive loading portion and uses the second zero-point generation circuit 220 as its zero-point generation portion.

Figure 4:
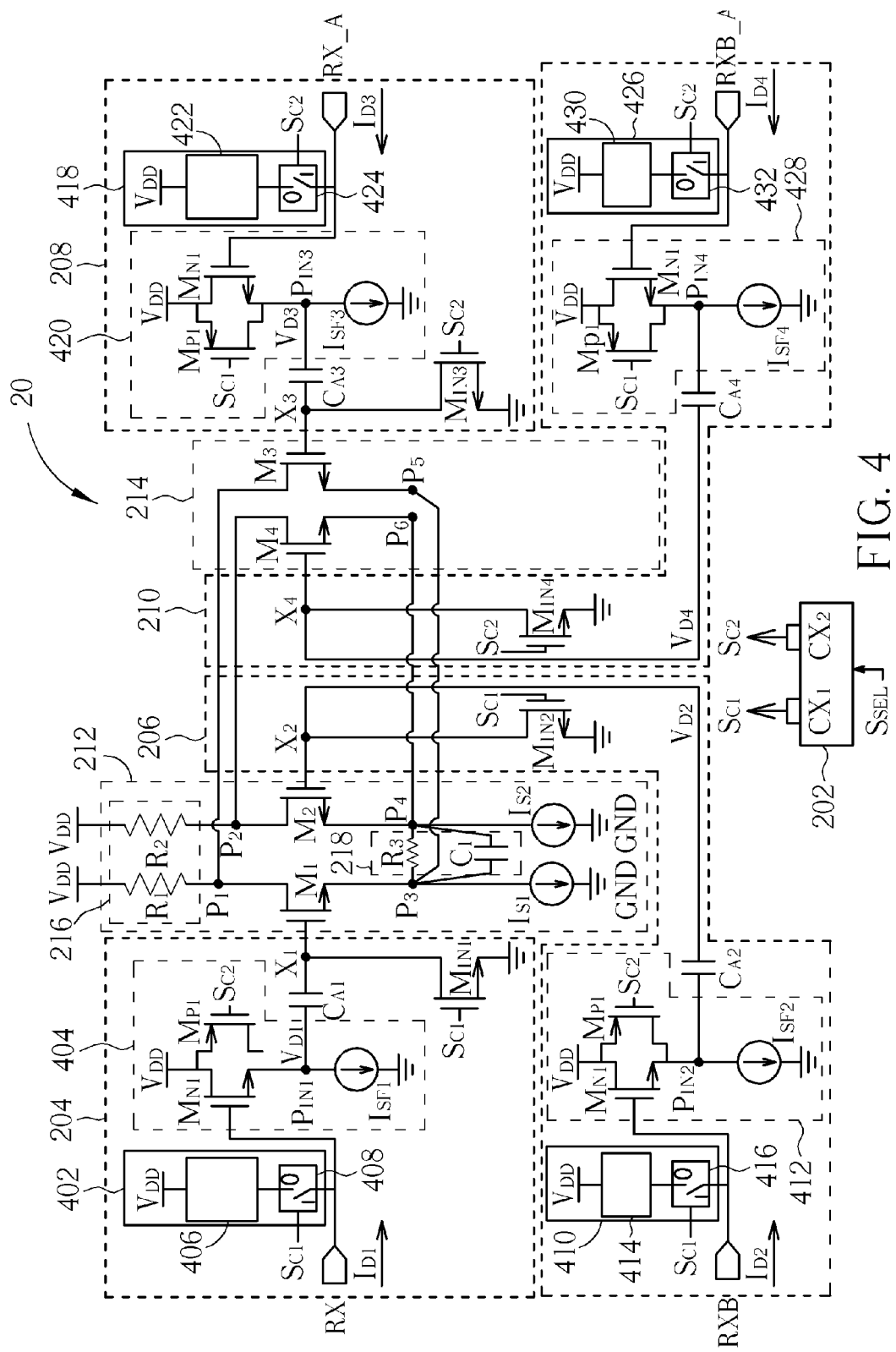
FIG. 4 is a schematic diagram of each input signal processing unit shown in FIG. 2 according to an embodiment of the present invention.
Figure 5:
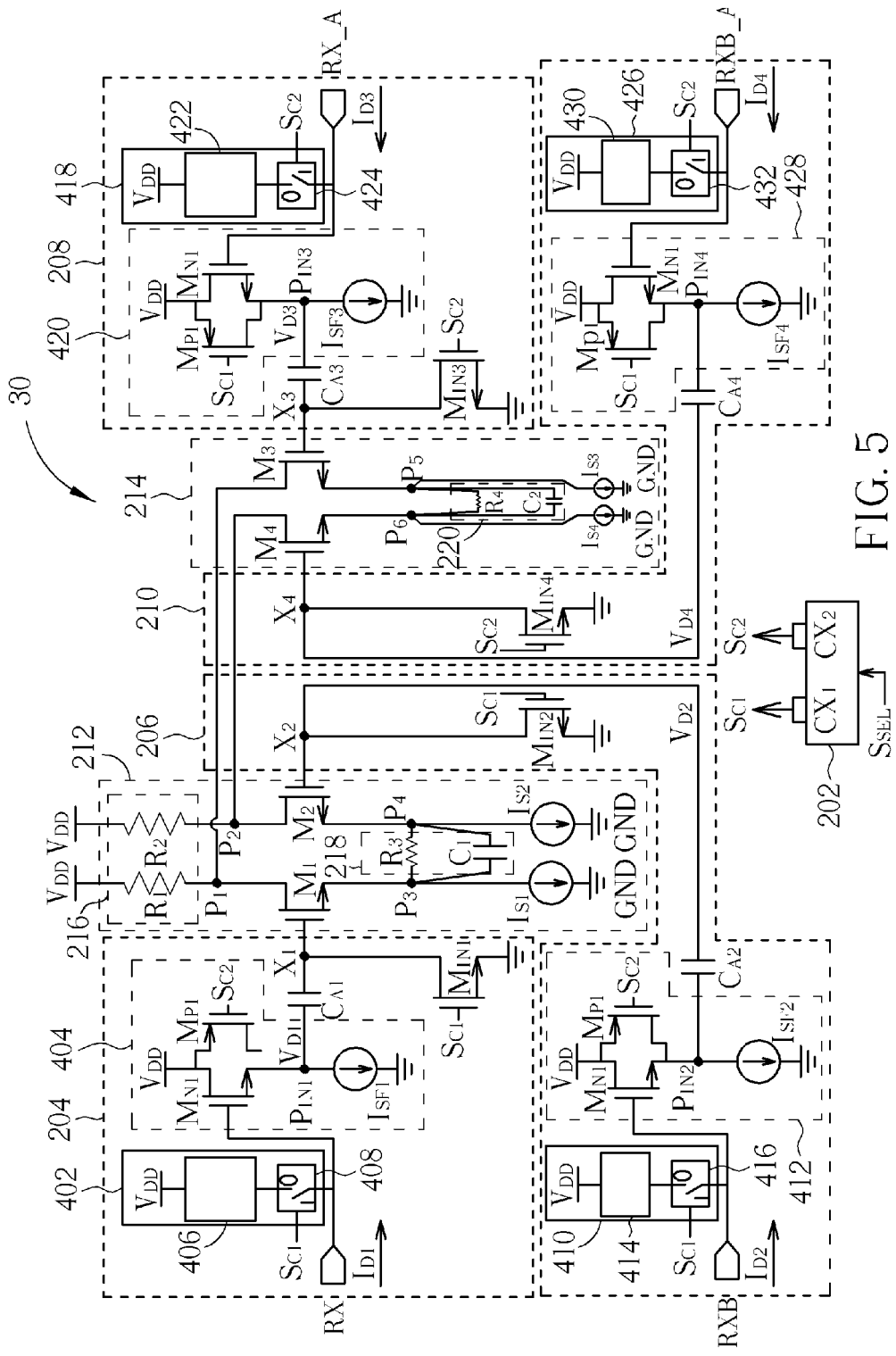
FIG. 5 is a schematic diagram of each input signal processing unit shown in FIG. 3 according to an embodiment of the present invention.

Further, illustration is provided of operation of the first input signal processing unit 204, the second input signal processing unit 206, the third input signal processing unit 208, and the fourth input signal processing unit 210. Please refer to FIG. 4 and FIG. 5. FIG. 4 is a schematic diagram of each input signal processing unit shown in FIG. 2 according to an embodiment of the present invention. FIG. 5 is a schematic diagram of each input signal processing unit shown in FIG. 3 according to an embodiment of the present invention. The first input signal processing unit 204 includes a first receiving end RX, a first conversion unit 402, a first level shifter 404, a first input node $P_{IN1}$, a first coupling capacitor $C_{A1}$, a first output end $X_1$, and a first input transistor $M_{IN1}$. The first receiving end RX is utilized for receiving the first differential current $I_{D1}$. The first conversion unit 402 is coupled to first receiving end RX and the first end CX1 of the control unit 202 for converting the first differential current $I_{D1}$ to the first differential voltage $V_{D1}$ according to the first control signal $S_{C1}$. The first conversion unit 402 includes a first impedance load unit 406 and a first impedance switch 408. The first impedance switch 408 is coupled to the first receiving end RX, the first end CX1 of the control unit 202 and the first impedance load unit 406 for conducting connection between the first receiving end RX and the first impedance load unit 406 when the first control signal $S_{C1}$ is at a low level, and controlling connection between the first receiving end RX and the first impedance load unit 406 be cut off when the first control signal $S_{C1}$ is at a high level. In addition, the relative position of the first impedance load unit 406 and the first impedance switch 408 can be exchanged for a power conversion purpose. The first level shifter 404 is coupled to the first receiving end RX, the first conversion unit 402, and the first input node $P_{IN1}$ for adjusting the DC voltage level of the first differential voltage $V_{D1}$ outputted from the first conversion unit 402. The first level shifter 404 includes a first n-type MOS transistor $M_{N1}$, a first p-type MOS transistor $M_{P1}$, and a first level current source $I_{SF1}$. The drain of the first n-type MOS transistor $M_{N1}$ is coupled to the voltage source $V_{DD}$, the source of the first n-type MOS transistor $M_{N1}$ is coupled to the first input node $P_{IN1}$, and the gate of the first n-type MOS transistor $M_{N1}$ is coupled to the first receiving end RX and the first impedance load unit 406. The source of the first p-type MOS transistor $M_{P1}$ is coupled to the voltage source $V_{DD}$, the drain of the first p-type MOS transistor $M_{N1}$ is coupled to the first input node $P_{IN1}$, and the gate of the first p-type MOS transistor $M_{N1}$ is coupled to the second end CX2 of the control unit 202. The first level current source $I_{SF1}$ is coupled between the first input node $P_{IN1}$ and the ground end GND. The first coupling capacitor $C_{A1}$ is coupled to the first input node $P_{IN1}$ for a coupling capacitor to couple the first differential voltage $V_{D1}$ to the first output end $X_1$. The first input transistor $M_{IN1}$ can be an n-type MOS transistor for conducting the signal received from the drain to the source according to the first control signal $S_{C1}$, which the drain of the first input transistor $M_{IN1}$ is coupled to the first output end $X_1$, the source of the first input transistor $M_{IN1}$ is coupled to the ground end GND, and the gate of the first input transistor $M_{IN1}$ is coupled to the first end CX1 of the control unit 202.

The structure of the second input signal processing unit 206 is the same as the first input signal processing unit 204, which includes a second receiving end RXB, a second conversion unit 410, a second level shifter 412, a second input node $P_{IN2}$, a second coupling capacitor $C_{A2}$, a second output end $X_2$, and a second input transistor $M_{IN2}$. The second conversion unit 410 includes a second impedance load unit 414 and a second impedance switch 416. The second level shifter 412 includes an n-type MOS transistor $M_{N1}$, a p-type MOS transistor $M_{P1}$, and a second level current source $I_{SF2}$. The third input signal processing unit 208 and the fourth input signal processing unit 210 also have the same structure, i.e. the third input signal processing unit 208 includes a third receiving end RX_A, a third conversion unit 418, a third level shifter 420, a third input node $P_{IN3}$, a third coupling capacitor $C_{A3}$, a third output end $X_3$, and a third input transistor $M_{IN3}$. The third conversion unit 418 includes a third impedance load unit 422 and a third impedance switch 424. The third level shifter 420 includes an n-type MOS transistor $M_{N1}$, a p-type MOS transistor $M_{P1}$, and a third level current source $I_{SF3}$. The fourth input signal processing unit 210 includes a fourth receiving end RXB_A, a fourth conversion unit 426, a third level shifter 428, a fourth input node $P_{IN4}$, a fourth coupling capacitor $C_{A4}$, a fourth output end $X_4$, and a fourth input transistor $M_{IN4}$. The fourth conversion unit 426 includes a fourth impedance load unit 430 and a fourth impedance switch 432. The fourth level shifter 426 includes an n-type MOS transistor $M_{N1}$, a p-type MOS transistor $M_{P1}$ and a fourth level current source $I_{SF4}$. Note that the second input signal processing unit 206, the third input signal processing unit 208, and the fourth input signal processing unit 210 with the same circuit scheme as those in the first input signal processing unit 204 have similar operations and functions, and further description thereof is omitted for brevity. The interconnections of the units are as shown in FIG. 4 and FIG. 5.

Further description is provided associated with operation of the dual-port input equalizer 20 and the dual-port input equalizer 30. Please further refer to FIG. 4 and FIG. 5. In general, the TMDS signals utilize current complementary transmission mode so that the video signals received by the first receiving end RX and the second receiving end RXB, or the third receiving end RX_A and the fourth receiving end RXB_A are a pair of complementary differential signals respectively. For example, the first differential current $I_{D1}$ and the second differential current $I_{D2}$ are a pair of complementary differential signals from a first video source, and the third differential current $I_{D3}$ and fourth differential current $I_{D4}$ are a pair of complementary differential signals from a second video source. If the selection signal $S_{SEL}$ is set to be low ($S_{SEL}=0$) to select the differential signals from the first video source, the control unit 202 will output the corresponding control signal to control the corresponding first equalizer 212 to perform an equalization process for the first differential current $I_{D1}$ and the second differential current $I_{D2}$ received by the first receiving end RX and second receiving end RXB, respectively. In such a condition, the first control signal $S_{C1}$ is at a low level ($S_{C1}=0$) and the second control signal $S_{C2}$ is at a high level ($S_{C2}=1$). Therefore, the first impedance switch 408 conducts connection between the first receiving end RX and the first impedance load unit 406, the second impedance switch 416 conducts connection between the second receiving end RXB and the second impedance load unit 414. Meanwhile, the third impedance switch 424 and the fourth impedance switch 434 are in a cut off state. Thus, the first differential current $I_{D1}$ and the second differential current $I_{D2}$ can be converted to the first differential voltage $V_{D1}$ and the second differential voltage $V_{D2}$ through the first impedance load unit 406 and the second impedance load unit 414. Furthermore, the first differential voltage $V_{D1}$ and the second differential voltage $V_{D2}$ can individually be coupled to the first output end $X_1$ and the second output end $X_2$ to be provided to the first equalizer 212 after the first differential voltage $V_{D1}$ and the second differential voltage $V_{D2}$ are level shifted by the first level shifter 404 and second level shifter 412, respectively. In the meantime, the voltage values on the third input node $P_{IN3}$ and the fourth input node $P_{IN4}$ increase, and the voltage values on the third output end $X_3$ and the fourth output end $X_4$ decrease, so that the third transistor $M_3$ and the fourth transistor $M_4$ are in a cut off state. In such a condition, the third differential voltage $V_{D3}$ and the fourth differential voltage $V_{D4}$ are separated completely, and can not affect the operation of the first equalizer 212. In this way, a corresponding selection signal $S_{SEL}$ is set to select the differential signals from the second video source, and the control unit 202 will output the corresponding control signal to control the corresponding second equalizer 214 to perform an equalization process for the third differential current $I_{D3}$ and the fourth differential current $I_{D4}$ received by the third receiving end RX_A and the fourth receiving end RXB_A, respectively. In other words, the selection signal $S_{SEL}$ can easily be utilized for selecting desired signals, and the other non-selected signals can be separated via the abovementioned design in order to avoid affecting the actual operation and achieve the purpose of sharing related circuit elements of the equalizers.

Figure 6:
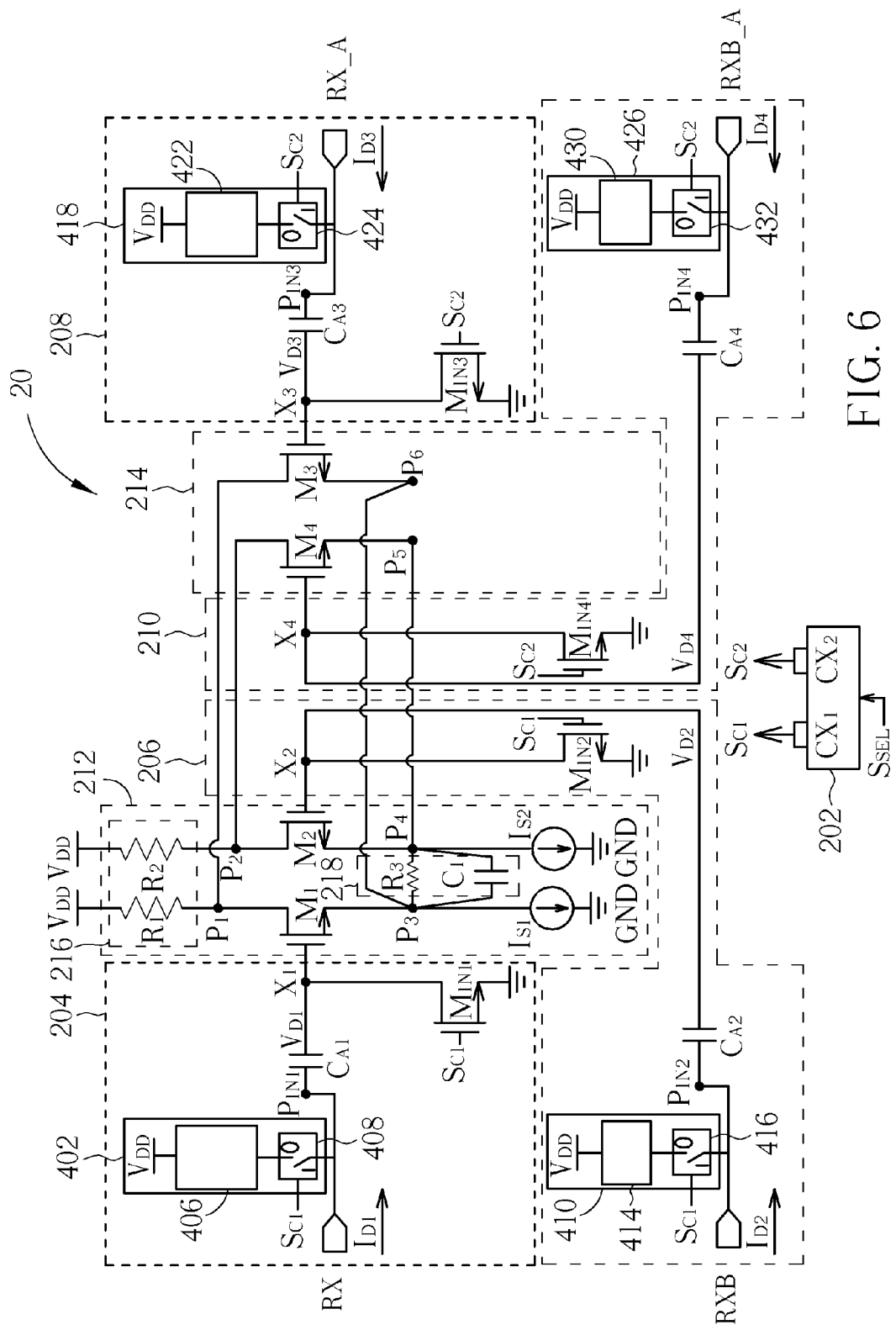
FIG. 6 is a schematic diagram of a dual-port input equalizer according to a third embodiment of the present invention.
Figure 7:
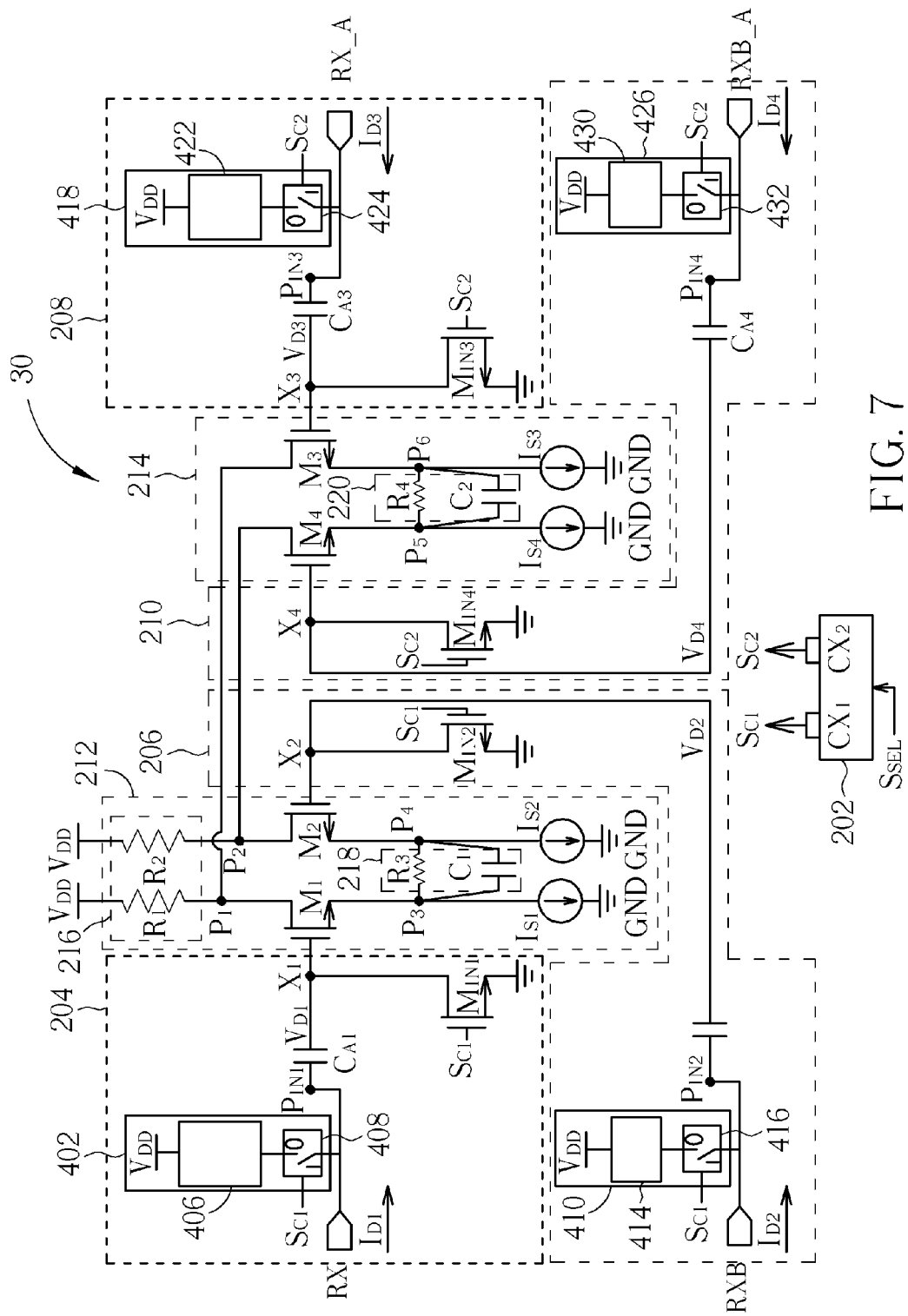
FIG. 7 is a schematic diagram of a dual-port input equalizer according to a fourth embodiment of the present invention.

On the other hand, please refer to FIG. 6 and FIG. 7, which are schematic diagrams of the dual-port input equalizer 20 and the dual-port input equalizer 30 according to alternate embodiments of the present invention. Because various signals have different DC offset effects, the present invention can adjust the DC voltage level of signals through the voltage level shifter for the equalizer. The voltage level shifter usually features a low pass frequency response, so high frequency portion of the signals will be attenuated after passing through the voltage level shifter. Therefore, as shown in FIG. 6 and FIG. 7, the dual-port input equalizer 20, 30 can omit the first level shifter 404, the second level shifter 412, the third level shifter 420, and the fourth level shifter 428 to avoid distortion for the attenuated high frequency portion. In such a condition, the direct current components of the signals can be reconstructed at the input end of the equalizer for compensating the omitted operation function.

Note that the embodiments of the dual-port input equalizers 20, 30 are exemplary embodiments of the present invention, and those skilled in the art can make alternations and modifications accordingly. For example, in the embodiment of present invention, the dual-port input equalizers 20, 30 receive two video signals from different sources, and this should not be a limitation of the present invention. The present invention can also be applied in any kind of analog front end circuit for receiving two or more signals for equalization. Moreover, any kind of device which can implement a current-to-voltage function is suitable for the first conversion unit 402, the second conversion unit 410, the third conversion unit 418, and the fourth conversion unit 416. The first level shifter 404, the second level shifter 412, the third level shifter 420, or the fourth level shifter 428 can be implemented by a source follower, and this is not limited. Any device or method which can realize voltage level conversion is available. On the other hand, the load unit 216 is utilized for providing a loading portion for transistors $M_1$ to $M_4$, which can be implemented in a passive or active load form. The first zero-point generation circuit 218 is coupled between the third node $P_3$ and the fourth node $P_4$ with the resistor $R_3$ and the first capacitor $C_1$ connected in parallel, and this should not be limited. The first zero-point generation circuit 218 can be implemented by another corresponding circuit in accordance with any equalizer design requirement. In the same way, the second zero-point generation circuit 220 can be implemented as well. In addition, although the above-mentioned transistors M1 to M4 may be n-type MOS transistors, respectively, this should not be a limitation of the present invention. The transistors $M_1$ to $M_4$ can be any other device having the same effect and function, e.g. bipolar junction transistors.

In summary, the present invention can share the circuit elements of each equalizer so as to reduce circuit structure and area, product size, and manufacturing costs substantially.

Those skilled in the art will readily observe that numerous modifications and alterations of the device and method may be made while retaining the teachings of the invention.

What is claimed is:
1. A dual-port input equalizer, comprising:
  a control unit, for generating a first control signal and a second control signal according to a selection signal;
  a first input signal processing unit, coupled to the control unit, for receiving a first differential current and outputting a first differential voltage according to the first control signal and the second control signal;
  a second input signal processing unit, coupled to the control unit, for receiving a second differential current and outputting a second differential voltage according to the first control signal and the second control signal;
  a third input signal processing unit, coupled to the control unit, for receiving a third differential current and outputting a third differential voltage according to the first control signal and the second control signal;
  a fourth input signal processing unit, coupled to the control unit, for receiving a fourth differential current and outputting a fourth differential voltage according to the first control signal and the second control signal;
  a first equalizer, coupled to the first input signal processing unit and the second input signal processing unit, for receiving the first differential voltage and the second differential voltage according to the first control signal and the second control signal, the first equalizer comprising:
a first node;
a second node;
a third node;
a fourth node;
a first transistor, comprising a first terminal coupled to the first input signal processing unit, a second terminal coupled to the first node, and a third terminal coupled to the third node;
a second transistor, comprising a first terminal coupled to the second input signal processing unit, a second terminal coupled to the second node, and a third terminal coupled to the fourth node;
a load unit, coupled to a voltage source, the first node, and the second node;
a first zero-point generation circuit, coupled between the third node and the fourth node;
a first current source, coupled between the third node and a ground end; and
a second current source, coupled between the fourth node and the ground end; and
a second equalizer, coupled to the third input signal processing unit and the fourth input signal processing unit, for receiving the third differential voltage and the fourth differential voltage according to the first control signal and the second control signal, the second equalizer comprising:
a fifth node;
a sixth node;
a third transistor, comprising a first terminal coupled to the third input signal processing unit, a second terminal coupled to the first node of the first equalizer, and a third terminal coupled to the fifth node; and
a fourth transistor, comprising a first terminal coupled to the fourth input signal processing unit, a second terminal coupled to the second node of the first equalizer, and a third terminal coupled to the sixth node;
wherein the first equalizer receives the first differential voltage and the second differential voltage when the selection signal is at a first level, and the second equalizer receives the third differential voltage and the fourth differential voltage when the selection signal is at a second level.

2. The dual-port input equalizer of claim 1, wherein the fifth and sixth nodes of the second equalizer are coupled to the third and fourth nodes of the first equalizer respectively.

3. The dual-port input equalizer of claim 1, wherein the second equalizer comprises:
a second zero-point generation circuit, coupled between the fifth node and the sixth node;
a third current source, coupled between the fifth node and the ground end; and
a fourth current source, coupled between the sixth node and the ground end.

4. The dual-port input equalizer of claim 1, wherein the control unit comprises a first end and a second end, and generates the first control signal via the first end and the second control signal via the second end respectively according to the selection signal, wherein the second control signal is the inverted first control signal.

5. The dual-port input equalizer of claim 1, wherein the first transistor is an n-type metal oxide semiconductor (MOS) transistor, the first terminal of the first transistor is a gate, the second terminal of the first transistor is a drain, and the third terminal of the first transistor is a source, the second transistor is an n-type MOS transistor, the first terminal of the second transistor is a gate, the second terminal of the second transistor is a drain, and the third terminal of the second transistor is a source, the third transistor is an n-type MOS transistor, the first terminal of the third transistor is a gate, the second terminal of the third transistor is a drain, and the third terminal of the third transistor is a source, the fourth transistor is an n-type MOS transistor, the first terminal of the fourth transistor is a gate, the second terminal of the fourth transistor is a drain, and the third terminal of the fourth transistor is a source.

6. The dual-port input equalizer of claim 1, wherein the first transistor and the second transistor, the third transistor and the fourth transistor are differential pairs respectively.

7. The dual-port input equalizer of claim 1, wherein the first input signal processing unit comprises:
a first receiving end, for receiving the first differential current;
a first input node, coupled to the first receiving end;
a first conversion unit, coupled to the first input node and a first end of the control unit, for converting the first differential current to the first differential voltage according to the first control signal;
a first coupling capacitor, coupled to the first input node;
a first output end, coupled to the first coupling capacitor and the first transistor, for outputting the first differential voltage; and
a first input transistor, comprising an input terminal coupled to the first output end, an output terminal coupled to the ground end, and a control terminal coupled to the first end of the control unit, for conducting the first differential voltage received by the input terminal to the output terminal according to the first control signal.

8. The dual-port input equalizer of claim 7, wherein the first conversion unit comprises:
a first impedance load unit, coupled to the voltage source, for converting the first differential current to the first differential voltage; and
a first impedance switch, coupled to the first input node, the first end of the control unit, and the first impedance load unit, for controlling connection between the first receiving end and the first impedance load unit to conduct or be cut off according to the first control signal.

9. The dual-port input equalizer of claim 7, wherein the first input transistor is an n-type MOS transistor, the input terminal of the first input transistor is a drain, the output terminal of the first input transistor is a source, and the control terminal of the first input transistor is a gate.

10. The dual-port input equalizer of claim 7, wherein the first input signal processing unit further comprises:
a first level shifter, coupled to the first receiving end, the first conversion unit, and the first input node, for adjusting the DC voltage level of the first differential voltage.

11. The dual-port input equalizer of claim 10, wherein the first level shifter comprises:
a first n-type MOS transistor, comprising an input terminal coupled to the voltage source, an output terminal coupled to the first input node, and a control end coupled to the first receiving end and the first conversion unit;
a first p-type MOS transistor, comprising an input terminal coupled to the voltage source, an output terminal coupled to the first input node, and a control end coupled to a second end of the control unit; and
a first level current source, coupled between the first input node and the ground end.

12. The dual-port input equalizer of claim 11, wherein the input terminal of the first n-type MOS transistor is a drain, the output terminal of the first n-type MOS transistor is a source, the control terminal of the first n-type MOS transistor is a gate, the input terminal of the first p-type MOS transistor is a source, the output terminal of the first p-type MOS transistor is a drain, and the control terminal of the first p-type MOS transistor is a gate.

13. The dual-port input equalizer of claim 1, wherein the second input signal processing unit comprises:
- a second receiving end, for receiving the second differential current;
- a second input node, coupled to the second receiving end;
- a second conversion unit, coupled to the second input node and a first end of the control unit, for converting the second differential current to the second differential voltage according to the first control signal;
- a second coupling capacitor, coupled to the second input node;
- a second output end, coupled to the second coupling capacitor and the second transistor, for outputting the second differential voltage; and
- a second input transistor, comprising an input terminal coupled to the second output end, an output terminal coupled to the ground end, and a control terminal coupled to the first end of the control unit, for conducting the second differential voltage received by the input terminal to the output terminal according to the first control signal.

14. The dual-port input equalizer of claim 13, wherein the second conversion unit comprises:
- a second impedance load unit, coupled to the voltage source, for converting the second differential current to the second differential voltage; and
- a second impedance switch, coupled to the second input node, the first end of the control unit, and the second impedance load unit, for controlling connection between the second receiving end and the second impedance load unit to conduct or be cut off according to the first control signal.

15. The dual-port input equalizer of claim 13, wherein the second input transistor is an n-type MOS transistor, the input terminal of the second input transistor is drain, the output terminal of the second input transistor is source, and the control terminal of the second input transistor is gate.

16. The dual-port input equalizer of claim 13, wherein the second input signal processing unit further comprises:
- a second level shifter, coupled to the second receiving end, the second conversion unit, and the second input node, for adjusting the DC voltage level of the second differential voltage.

17. The dual-port input equalizer of claim 16, wherein the second level shifter comprises:
- a second n-type MOS transistor, comprising an input terminal coupled to the voltage source, an output terminal coupled to the second input node, and a control end coupled to the second receiving end and the second conversion unit;
- a second p-type MOS transistor, comprising an input terminal coupled to the voltage source, an output terminal coupled to the second input node, and a control end coupled to a second end of the control unit; and
- a second level current source, coupled between the second input node and the ground end.

18. The dual-port input equalizer of claim 17, wherein the input terminal of the second n-type MOS transistor is a drain, the output terminal of the second n-type MOS transistor is a source, the control terminal of the second n-type MOS transistor is a gate, the input terminal of the second p-type MOS transistor is a source, the output terminal of the second p-type MOS transistor is a drain, and the control terminal of the second p-type MOS transistor is a gate.

19. The dual-port input equalizer of claim 1, wherein the third input signal processing unit comprises:
- a third receiving end, for receiving the third differential current;
- a third input node, coupled to the third receiving end;
- a third conversion unit, coupled to the third input node and a second end of the control unit, for converting the third differential current to the third differential voltage according to the second control signal;
- a third coupling capacitor, coupled to the third input node;
- a third output end, coupled to the third coupling capacitor and the third transistor, for outputting the third differential voltage;
- a third input transistor, comprising an input terminal coupled to the third output end, an output terminal coupled to the ground end, and a control terminal coupled to the second end of the control unit, for conducting the third differential voltage received by the input terminal to the output terminal according to the second control signal.

20. The dual-port input equalizer of claim 19, wherein the third conversion unit comprises:
- a third impedance load unit, coupled to the voltage source, for converting the third differential current to the third differential voltage; and
- a third impedance switch, coupled to the third input node, the second end of the control unit, and the third impedance load unit, for controlling connection between the third receiving end and the third impedance load unit to conduct or be cut off according to the second control signal.

21. The dual-port input equalizer of claim 19, wherein the third input transistor is an n-type MOS transistor, the input terminal of the third input transistor is a drain, the output terminal of the third input transistor is a source, and the control terminal of the third input transistor is a gate.

22. The dual-port input equalizer of claim 19, wherein the third input signal processing unit further comprises:
- a third level shifter, coupled to the third receiving end, the third conversion unit, and the third input node, for adjusting the DC voltage level of the third differential voltage.

23. The dual-port input equalizer of claim 22, wherein the third level shifter comprises:
- a third n-type MOS transistor, comprising an input terminal coupled to the voltage source, an output terminal coupled to the third input node, and a control end coupled to the third receiving end and the third conversion unit;
- a third p-type MOS transistor, comprising an input terminal coupled to the voltage source, an output terminal coupled to the third input node, and a control end coupled to a first end of the control unit; and
- a third level current source, coupled between the third input node and the ground end.

24. The dual-port input equalizer of claim 23, wherein the input terminal of the third n-type MOS transistor is a drain, the output terminal of the third n-type MOS transistor is a source, the control terminal of the third n-type MOS transistor is a gate, the input terminal of the third p-type MOS transistor is a source, the output terminal of the third p-type MOS transistor is a drain, and the control terminal of the third p-type MOS transistor is a gate.

25. The dual-port input equalizer of claim 1, wherein the fourth input signal processing unit comprises:
- a fourth receiving end, for receiving the fourth differential current;
- a fourth input node, coupled to the fourth receiving end;
- a fourth conversion unit, coupled to the fourth input node and a second end of the control unit, for converting the fourth differential current to the fourth differential voltage according to the second control signal;
- a fourth coupling capacitor, coupled to the fourth input node;
- a fourth output end, coupled to the fourth coupling capacitor and the fourth transistor, for outputting the fourth differential voltage;
- a fourth input transistor, comprising an input terminal coupled to the fourth output end, an output terminal coupled to the ground end, and a control terminal coupled to the second end of the control unit, for conducting the fourth differential voltage received by the input terminal to the output terminal according to the second control signal.

26. The dual-port input equalizer of claim 25, wherein the fourth conversion unit comprises:
- a fourth impedance load unit, coupled to the voltage source, for converting the fourth differential current to the fourth differential voltage; and
- a fourth impedance switch, coupled to the fourth input node, the second end of the control unit, and the fourth impedance load unit, for controlling connection between the fourth receiving end and the fourth impedance load unit to conduct or be cut off according to the second control signal.

27. The dual-port input equalizer of claim 25, wherein the fourth input transistor is an n-type MOS transistor, the input terminal of the fourth input transistor is a drain, the output terminal of the fourth input transistor is a source, and the control terminal of the fourth input transistor is a gate.

28. The dual-port input equalizer of claim 25, wherein the fourth input signal processing unit further comprises:
- a fourth level shifter, coupled to the fourth receiving end, the fourth conversion unit, and the fourth input node, for adjusting the DC voltage level of the fourth differential voltage.

29. The dual-port input equalizer of claim 28, wherein the fourth level shifter comprises:
- a fourth n-type MOS transistor, comprising an input terminal coupled to the voltage source, an output terminal coupled to the fourth input node, and a control end coupled to the fourth receiving end and the fourth conversion unit;
- a fourth p-type MOS transistor, comprising an input terminal coupled to the voltage source, an output terminal coupled to the fourth input node, and a control end coupled to a first end of the control unit; and
- a fourth level current source, coupled between the fourth input node and the ground end.

30. The dual-port input equalizer of claim 29, wherein the input terminal of the fourth n-type MOS transistor is a drain, the output terminal of the fourth n-type MOS transistor is a source, the control terminal of the fourth n-type MOS transistor is a gate, the input terminal of the fourth p-type MOS transistor is a source, the output terminal of the fourth p-type MOS transistor is a drain, and the control terminal of the fourth p-type MOS transistor is a gate.

31. The dual-port input equalizer of claim 1, wherein the load unit comprises:
- a first resistor, coupled between the voltage source and the first node; and
- a second resistor, coupled between the voltage source and the second node.

32. The dual-port input equalizer of claim 1, wherein the first zero-point generation circuit comprises:
- a third resistor, coupled between the third node and the fourth node; and
- a first capacitor, coupled between the third node and the fourth node.

33. The dual-port input equalizer of claim 1, wherein the second zero-point generation circuit comprises:
- a fourth resistor, coupled between the fifth node and the sixth node; and
- a second capacitor, coupled between the fifth node and the sixth node.

* * * * *